United States Patent
Beaurepaire et al.

(10) Patent No.: US 12,472,955 B2
(45) Date of Patent: Nov. 18, 2025

(54) APPARATUS AND METHODS FOR PREDICTING EVENTS IN WHICH DRIVERS RENDER AGGRESSIVE BEHAVIORS WHILE MANEUVERING VEHICLES

(71) Applicant: HERE GLOBAL B.V., Eindhoven (NL)

(72) Inventors: Jerome Beaurepaire, Nantes (FR); Nicolas Neubauer, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 310 days.

(21) Appl. No.: 17/842,489

(22) Filed: Jun. 16, 2022

(65) Prior Publication Data

US 2023/0406325 A1   Dec. 21, 2023

(51) Int. Cl.
*G06N 5/04* (2023.01)
*B60W 40/04* (2006.01)
(Continued)

(52) U.S. Cl.
CPC .......... *B60W 40/09* (2013.01); *B60W 40/04* (2013.01); *B60W 40/06* (2013.01); *G06N 5/046* (2013.01); *B60W 2556/10* (2020.02)

(58) Field of Classification Search
CPC ...... B60W 40/09; B60W 40/04; B60W 40/06; B60W 2556/10; B60W 2540/30;
(Continued)

(56) References Cited

U.S. PATENT DOCUMENTS 10,322,728 B1   6/2019   Porikli et al.
11,548,515 B2 *  1/2023   Ucar ................... B60W 40/09
(Continued)

FOREIGN PATENT DOCUMENTS

CN   108216254 A   6/2018
CN   110751381 A   2/2020
(Continued)

OTHER PUBLICATIONS

Wan, et al., "Driving Anger States Detection Based on Incremental Association Markov Blanket and Least Square Support Vector Machine," East China Jiaotong University; Wuhan University of Technology; Hindawi Discrete Dynamics in Nature and Society, vol. 2019, Article ID 2745381, 17 pages—https://doi.org/10.1155/2019/2745381.

*Primary Examiner* — Nga X Nguyen
(74) *Attorney, Agent, or Firm* — Peter H. Yu; HERE GLOBAL B.V.

(57) ABSTRACT

An apparatus, method and computer program product are provided for predicting events in which drivers render aggressive behaviors while maneuvering vehicles. In one example, the apparatus receives input data indicating a target location and including attribute data associated with the target location. The apparatus causes a machine learning model to generate output data as a function of the input data. The output data indicate a likelihood in which a target driver will render an aggressive behavior at the target location while maneuvering a target vehicle. The machine learning model is trained to generate the output data as a function of the input data by using historical data indicating events in which drivers rendered the aggressive behavior while maneuvering vehicles.

20 Claims, 9 Drawing Sheets

(51) Int. Cl.
*B60W 40/06* (2012.01)
*B60W 40/09* (2012.01)
*G06N 5/046* (2023.01)

(58) Field of Classification Search
CPC .......... B60W 2552/00; B60W 2555/20; G06N 5/046; G06N 20/00; G07C 5/008
See application file for complete search history.

(56) References Cited

U.S. PATENT DOCUMENTS

| | | | |
|---|---|---|---|
| 2011/0224893 A1* | 9/2011 | Scofield | G08G 1/052 |
| | | | 701/119 |
| 2017/0098373 A1* | 4/2017 | Filley | H04W 4/90 |
| 2019/0049267 A1* | 2/2019 | Huang | G01C 21/3697 |
| 2019/0113354 A1* | 4/2019 | Matsumura | G01C 21/20 |
| 2020/0132492 A1* | 4/2020 | Mendels | G01C 21/362 |
| 2021/0094547 A1* | 4/2021 | Garcia | G05D 1/0088 |
| 2021/0107496 A1* | 4/2021 | Oboril | B60W 60/0013 |
| 2021/0125076 A1* | 4/2021 | Zhang | G08G 1/0137 |
| 2022/0274603 A1* | 9/2022 | Karve | G06N 3/047 |

FOREIGN PATENT DOCUMENTS

| | | |
|---|---|---|
| CN | 109498041 B | 4/2021 |
| JP | 2021051414 A | 4/2021 |

* cited by examiner

APPARATUS AND METHODS FOR PREDICTING EVENTS IN WHICH DRIVERS RENDER AGGRESSIVE BEHAVIORS WHILE MANEUVERING VEHICLES

TECHNICAL FIELD

The present disclosure generally relates to the field of roadside event prediction, associated methods and apparatus, and in particular, concerns, for example, an apparatus configured to predict events in which drivers render aggressive behaviors while maneuvering vehicles based on attributes associated with locations of the events.

BACKGROUND

Drivers are susceptible to expressing aggressive emotions when encountering hostile road events. Such events may be defined by reckless driving maneuvers executed by neighboring drivers and may motivate the drivers impacted by the events to retaliate, thereby increasing the chance in which the drivers encounter accidents and render hazardous conditions for other drivers and pedestrians.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive historical data indicating events in which drivers rendered an aggressive behavior while maneuvering vehicles, the historical data indicating first attributes associated with road segments in which the events have occurred, second attributes associated with points-of-interest (POIs) within peripherals of the road segments, third attributes associated with landmarks within the peripherals, or a combination thereof; and using the historical data, train a machine learning model to generate output data as a function of input data, wherein the input data indicate a target location and include attribute data associated with the target location, and wherein the output data indicates a likelihood in which a target driver will render the aggressive behavior at the target location while maneuvering a target vehicle.

According to a second aspect, a non-transitory computer-readable storage medium having computer program code instructions stored therein is described. The computer program code instructions, when executed by at least one processor, cause the at least one processor to: receive input data indicating a target location and including attribute data associated with the target location; and cause a machine learning model to generate output data as a function of the input data, wherein the output data indicate a likelihood in which a target driver will render an aggressive behavior at the target location while maneuvering a target vehicle, wherein the machine learning model is trained to generate the output data as a function of the input data by using historical data indicating events in which drivers rendered the aggressive behavior while maneuvering vehicles, the historical data indicating first attributes associated with road segments in which the events have occurred, second attributes associated with points-of-interest (POIs) within peripherals of the road segments, third attributes associated with landmarks within the peripherals, or a combination thereof.

According to a third aspect, a map layer of one or more aggressive driver behavior events is described. The method includes: receiving input data indicating a target location and including attribute data associated with the target location; causing a machine learning model to generate output data as a function of the input data, wherein the output data indicate a likelihood in which a target driver will render an aggressive behavior at the target location while maneuvering a target vehicle, wherein the machine learning model is trained to generate the output data as a function of the input data by using historical data indicating events in which drivers rendered the aggressive behavior while maneuvering vehicles, the historical data indicating first attributes associated with road segments in which the events have occurred, second attributes associated with points-of-interest (POIs) within peripherals of the road segments, third attributes associated with landmarks within the peripherals, or a combination thereof; and updating the map layer to include a datapoint indicating the output data at the target location.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

As discussed above, drivers may render aggressive behaviors when encountering certain types of road environments and conditions. Such behaviors may be defined as road rage, and common forms of road rage include yelling, honking, tailgating, pursuing other vehicles, intentionally blocking traffic, preventing other drivers from changing lanes, overtaking other vehicles, brake checking other vehicles, intentionally cutting off other cars, initiating confrontation outside of the vehicle, intentionally ramming another vehicle, speeding, driving on sidewalks or medians, etc. Road rage events may occur frequently in locations in which a large density of vehicles is congregated. However, additional factors that attribute to such events may be defined by road geometry, time of day, traffic congestion, driver's urgency to reach a destination, driving patterns of neighboring vehicles, etc. Systems and methods for predicting events in which drivers render aggressive behaviors while maneuvering vehicles will be described in detail, herein.

Figure 1:
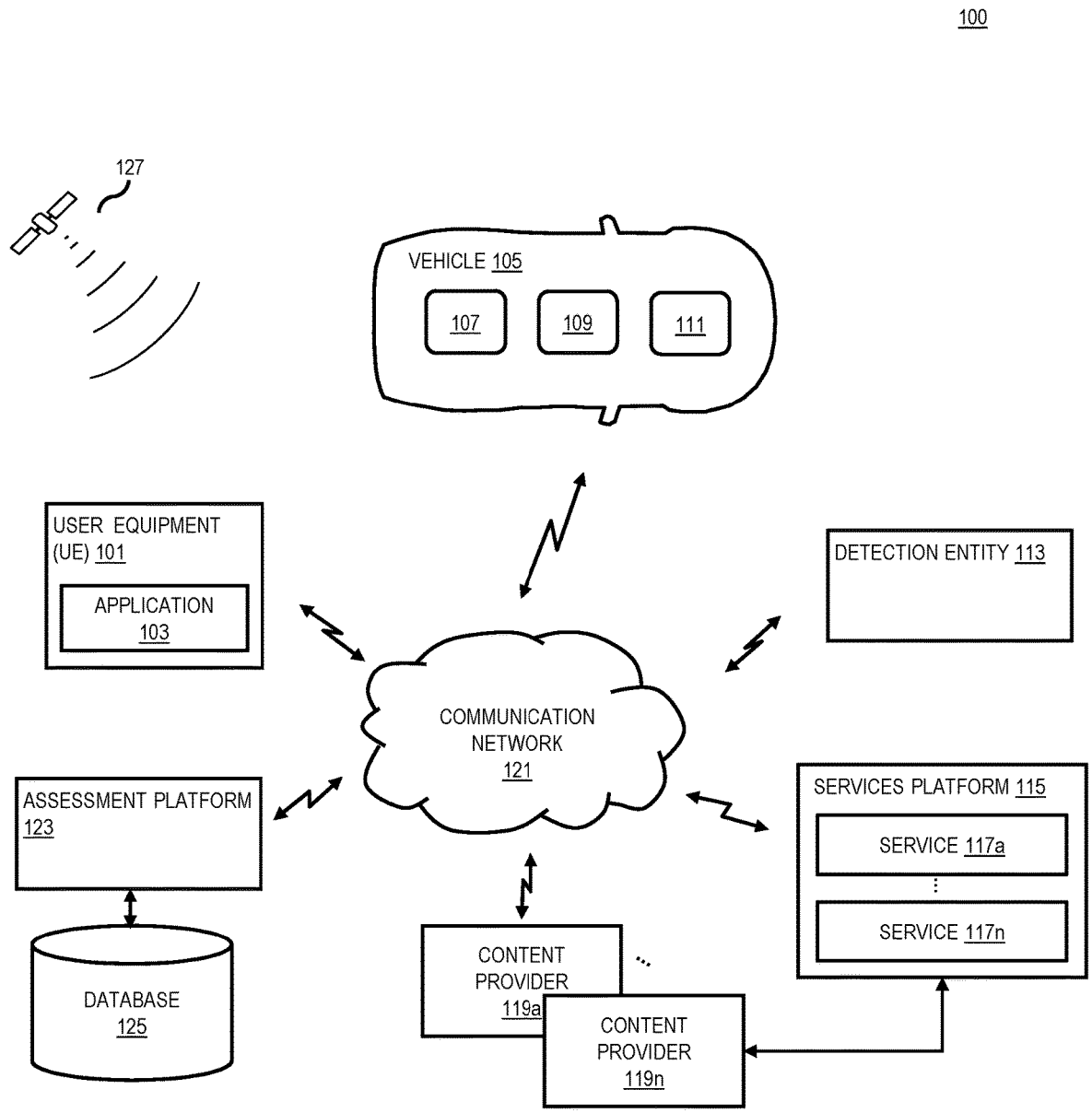
FIG. 1 illustrates a diagram of a system capable of predicting events in which drivers render aggressive behaviors while maneuvering vehicles.

FIG. 1 is a diagram of a system 100 capable of predicting events in which drivers render aggressive behaviors while maneuvering vehicles, according to one embodiment. Such events will be referred as aggressive driver behavior events, herein. The system includes a user equipment (UE) 101, a vehicle 105, a detection entity 113, a services platform 115, content providers 119a-119n, a communication network 121, an assessment platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the assessment platform 123 via the communication network 121. The assessment platform 123 performs one or more functions associated with predicting events in which drivers render aggressive behaviors while maneuvering vehicles. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 123 and perform one or more functions associated with the functions of the assessment platform 123 by interacting with the assessment platform 123 over the communication network 121. The application 103 may be used convey information regarding predictions of events in which drivers render aggressive behaviors while maneuvering vehicles. For example, the application 103 may indicate a likelihood in which an aggressive driver behavior events will occur at one or more locations and provide a route based on said locations of the aggressive driver behavior events (e.g., providing a route that avoids the locations).

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In one embodiment, the vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 105 along a path of travel, etc. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Said sensors 107 may also detect orientations of such objects. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 123, the UE 101, the services platform 115, one or more of the content providers 119*a*-119*n*, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, a road-side sensor, or a device mounted on a stationary object within or proximate to a road segment (e.g., a traffic light post, a sign post, a post, a building, etc.). The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the assessment platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the assessment platform 123, the database 125, or other entities communicatively coupled to the communication network 121 through the service platform 115. In one embodiment, the services platform 115 uses the output data generated by of the assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the assessment platform 123, or the combination thereof. In one embodiment, the content provided may be any type of content, such as map content, textual content, audio content, video content, image content, etc. In one embodiment, the content providers 119 may provide content that may aid in predicting events in which drivers render aggressive behaviors while maneuvering vehicles, and/or other related characteristics. In one embodiment, the content providers 119 may also store content associated with the UE 101, the vehicle 105, services platform 115, the assessment platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 123 may be a platform with multiple interconnected components. The assessment platform 123 may include multiple servers, intelligent networking devices, computing devices, components and corresponding software for predicting events in which drivers render aggressive behaviors while maneuvering vehicles. It should be appreciated that that the assessment platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), other platforms embodying a power supplier (not illustrated), or a combination thereof.

The assessment platform 123 is capable of: (1) acquiring historical data indicating aggressive driver behavior events; (2) using the historical data to train a machine learning model to predict an aggressive driver behavior event as a function of attribute data associated with a location; and (3) cause the machine learning model to predict an aggressive driver behavior event; and (4) providing applications to mitigate occurrences of predicted aggressive driver behavior events and prevent drivers from encountering the predicted aggressive driver behavior events. The assessment platform 123 embodies a machine learning model and trains the machine learning model to output the prediction of aggressive driver behavior events by using historical data as training data set.

The historical data include sensor data indicating aggressive driver behaviors. The sensor data may be acquired via sensors equipped within the vehicles (e.g., a driver facing camera, an audio recorder within a vehicle cabin, etc.), sensors equipped outside the vehicles (e.g., exterior facing cameras, external audio recorders, etc.), user devices associated with drivers that rendered the aggressive driver behaviors (e.g., a camera equipped by a mobile device, an audio recorder equipped by the mobile device, a heartrate monitor equipped by a wearable device, such as a smartwatch, etc.), or a combination thereof. The sensor data indicate ways of which drivers expressed the aggressive driver behaviors. Such data may indicate events in which the drivers: (1) yelled; (2) said certain offensive languages; (3) demonstrated frustrated expressions (e.g., rolling eyes, frowning, etc.); (4) expressed aggressive gestures (e.g., waving arms, pointing, offensive hand motions, etc.); or (5) a combination thereof. The sensor data may also indicate ways of which drivers maneuvered the vehicles to express the aggressive driver behaviors. Such data may indicate events in which the drivers operated the vehicles to: (1) tailgate other vehicles; (2) actively pursue other vehicles; (3) block traffic; (4) prevent other drivers from changing lanes; (5) overtake other vehicles; (5) brake checking other vehicles; (6) cut off other vehicles, (7) render contact with other vehicles; (8) move over or under speed limits; (9) moves on terrains that are not designated for vehicles; or (10) a combination thereof. The sensor data may also indicate vehicle features used by a driver of a vehicle for the driver to express the aggression thereof, such as use of a vehicle horn, high beams, etc. The sensor data may also indicate other types of sensor data that define the contexts in which the aggressive driver behavior events have occurred. For example, such sensor data may indicate: (1) air temperature levels within the vehicles during the aggressive driver behavior events; (2) noise/sound levels within the vehicles during the aggressive driver behavior events; (3) one or more object of which the drivers were observing during the aggressive driver behavior events (e.g., via eye tracking through driver facing cameras); (4) images of environments in which the vehicles were traversing during the aggressive driver behavior events; (5) weather conditions in which the vehicles were traversing during the aggressive driver behavior events; (6) speed levels at which the vehicles were traversing during the aggressive driver behavior events; (7) a number of vehicles impacted by the vehicles of the aggressive driver behavior events (e.g., a number of vehicles that had to brake, avoid, or deviate from original routes thereof); or (8) a combination thereof.

For each of the aggressive driver behavior events, the historical data indicate: (1) a starting time of the event; (2) an ending time of the event; and (3) a duration of the event. Additionally, the historical data indicate paths of movements taken by the vehicles during the aggressive driver behavior events. Sensor data, such as image data including images of environments in which the vehicles were traversing during the aggressive driver behavior events, may be classified by assessment platform 123 to identify one or more road objects, points-of-interest (POIs), road attributes, one or more other vehicles, pedestrians, landmarks, or a combination thereof. Objects classified in the sensor data are included within the historical data to further specify the contexts in which the aggressive driver behavior events have occurred.

In one embodiment, in addition to the objects as classified in the image data, the historical data may further include objects as defined within map data that are relevant to the aggressive driver behavior events. For example, the paths of movement taken by the vehicles of the aggressive drive behavior events may be compared with map data stored in the services platform 115, one or more of the content providers 119, the database 125, or a combination thereof to identify objects that are within the locations of the paths of movements and attributes associated with the objects. For the path of movement taken by each of the vehicles of the aggressive driver behavior events, the assessment platform 123 may use the map data identify one or more road segments/nodes traversed by said vehicle and road attribute data associated with said road segments/nodes. The road attribute data may indicate a type of road segment, a type of node, road length, road breadth, slope information, curvature information, geographic attributes, traffic information (e.g., traffic rules), a number of lanes, a width of each lane, a presence of one or more bike lanes within one or more road segments, one or more terminating ends of one or more bike lanes within one or more road segments, a number of shoulders within a road segment, a width of each shoulder, a number of lane merging points, a connection of a road segment to an entrance/exit of a POI, a road surface type, a quality of road surface, a number traffic lights within a road segment/node, a duration of traffic signal change, a number of crosswalks within a road segment/node, a number of traffic signs within a road segment/node, a type of traffic sign within a road segment/node, a number of traffic cameras within a road segment/node, a type of traffic camera within a road segment/node, or a combination thereof. For the path of movement taken by each of the vehicles of the aggressive driver behavior events, the assessment platform 123 may further use the map data to identify one or more POIs that is within a peripheral of each road segment/node traversed by said vehicle and one or more attributes associated with said POI. For example, the attributes may indicate: (1) a type of POI; (2) a dimension; (3) whether a roadway belonging to a POI is directly connected to said road segment; (4) a position of a POI relative to said road segment; (5) whether a POI obstruct visibility of a portion of said road segment or another road segment connected to said road segment; (6) one or more types of vehicle entering or exiting said POI; or (7) a combination thereof. For the path of movement taken by each of the vehicles of the aggressive driver behavior events, the assessment platform 123 may use the map data to further identify one or more POIs that is within a peripheral of each road segment/node traversed by said vehicle and one or more attributes associated with said POI. For example, said attributes may indicate: (i) a type of POI; (2) a dimension; (3) whether a roadway belonging to a POI is directly connected to said road segment/node; (4) a position of a POI relative to said road segment/node; or (5) a combination thereof. For the path of movement taken by each of the vehicles of the aggressive driver behavior events, the assessment platform 123 may further use the map data to identify one or more landmarks within a peripheral of each road segment/node traversed by said vehicle and one or more attributes associated with said landmark. For example, the attribute may indicate: (1) a type of landmark; (2) a dimension; (3) a position of a landmark relative to said road segment/node; or (4) a combination thereof. It should be appreciated that attributes of roads, POI, and landmarks within a given location may provide contexts as to why aggressive driver behavior events frequently occurs at the location. For example, lane merging points within road links may cause drivers to be frequently aggressive due to vehicles aggressively cutting off other vehicles at said points, entrances to POIs may increase traffic density at road segments directly connected to the entrances, thereby frustrating drivers impacted by the increased traffic density in the road segments, or POIs and/or landmarks may obstruct field of vision for drivers within road links/nodes, thereby frustrating the drivers. By way of another example, POIs and/or landmarks may also attribute to rise in aggressive driver behaviors in that the POIs and/or landmarks may be popular destinations for tourism and increase traffic density at the peripherals of the POIs and/or landmarks during peak hours for tourism.

In one embodiment, certain information within the historical data may be provided by one or more detection entities 113 that was within one or more locations in which the aggressive driver behavior events have occurred during the periods of said events, the services platform 115, one or more of the content providers 119, the database 125, or a combination thereof. Such information may indicate traffic density information indicating degrees of vehicle traffic within the one or more locations during the periods, degrees of micromobility vehicle traffic within the one or more locations during the periods, and degrees of pedestrian traffic within the one or more locations during the periods, or a combination thereof. Such information may further indicate a pattern of movement for the vehicle traffic within the one or more locations during the periods, a pattern of movement for the micromobility vehicle traffic within the one or more locations during the periods, a pattern of movement for the pedestrian traffic within the one or more locations during the periods, or a combination thereof. Such information may also indicate sun angles with respect to locations of the one or more locations during the periods and sun intensity levels at the one or more locations during the periods. Such information may also indicate whether certain roadside events, such as construction works, street festivals, protests, sporting events, etc., were occurring at the one or more locations during the periods.

In one embodiment, the historical data may further indicate vehicle attributes associated with the vehicles of the aggressive driver behavior events and driver attributes associated with the drivers of the aggressive driver behavior events. The vehicle attributes may indicate standard vehicle specifications such as vehicle type, dimensions, maximum power, maximum torque, etc. The driver attributes may indicate a pattern of which a driver maneuvers a type of vehicle. For example, the driver attributes may indicate a pattern of which a driver makes a turn at an intersection when using a truck versus a sedan, a pattern of which a driver causes a vehicle to slow to a stop at a stop sign when using a sports utility vehicle (SUV) versus a sedan, a pattern of which a driver maneuvers a vehicle in a highway when using a truck versus a sedan, etc. The driver attributes may also indicate a pattern of which a driver maneuvers a vehicle within a given route. For example, the given route may be a route from a driver's residence to the driver's workplace. The driver attributes may also indicate a number of occasions in which a driver violated a traffic rule, the severity of the violated traffic rule, a number of vehicle accidents in which a driver was involved, the severity of the vehicle accidents, etc. The vehicle attributes and the driver attributes may be acquired via the vehicles driven by the drivers, mobile devices associated with the drivers, one or more detection entities 113 that was within one or more locations in which the aggressive driver behavior events have occurred during the periods of said events, the services platform 115, one or more of the content providers 119, the database 125, or a combination thereof.

In one embodiment, the assessment platform 123 analyses sensor data received from sensors equipped by vehicles of the aggressive driver behavior events, identifies an object that has rendered the aggressive behaviors for the drivers of the vehicles, and incorporates the identified object within the historical data as a reason for the cause of the aggressive driver behavior events. By way of example, the assessment platform 123 receives first image data acquired by front facing cameras of a vehicle, audio data within a vehicle cabin of the vehicle, and second image data acquired by driver facing cameras of the vehicle. In such example, the first image data indicate a user of a bicycle cutting off the vehicle, the audio data include an audio recording of the driver expressing an offensive language, and the second image data include data indicating eye directions of the driver. The assessment platform 123 analyses the first, second, and third data and determines that a reason for the driver's aggression was due to the bicycle user cutting of the vehicle. It is contemplated that the assessment platform 123 cannot always conclude what the exact reasons were for the cause of the aggressive driver behavior events. As such, in one embodiment, the assessment platform 123 may simply render a connection between all objects that were observed by the driver, the vehicle, or a combination thereof during the aggressive driver behavior events and incorporate information indicating such connection to the historical data.

The machine learning model receives the historical data and transforms the historical data into machine-readable and generalizable vectors. The machine learning model renders context around the historical data such that commonalities can be detected. Once the machine learning model translates the historical data into a vector format suitable to be used as a feature vector for machine learning, the assessment platform 123 trains the machine learning model on resulting pairs (i.e., observations as seen in the historical data and desired output value). For example, a desired output value may be defined by a number of expected aggressive driver behavior events rendered by a driver of a vehicle while the vehicle traverses a road segment, and observations may be defined by aggregating all occurrences of past events in which aggressive driver behavior events have occurred on a particular road segment during a particular setting (e.g., all occurrences having the same vector representation). In one embodiment, the machine learning model may incorporate supervised machine learning techniques. In one embodiment, the machine learning model may incorporate a standard regression or classification task.

Once the machine learning model is trained, the machine learning model may receive input data indicating one or more locations for applying a prediction of aggressive driver behavior events and output data indicating a likelihood of which one or more aggressive driver behavior events will occur at the one or more target locations for a target vehicle. Herein, a "target" modifier refers to an object of which a prediction of is rendered for or an object/data used for rendering the prediction. The input data may include sensor data, road attribute data, POI data, landmark data, vehicle attribute data, driver attribute data, or a combination thereof. The sensor data may indicate sensor readings acquired at the one or more locations (e.g., via one or more detection entities 113 at the one or more target locations) and sensor readings acquired by the target vehicle (e.g., the vehicle 105) and/or a user device associated with a target driver of the target vehicle (e.g., UE 101). The sensor readings acquired at the one or more locations may indicate one or more attributes/conditions of an environment of the one or more locations, and the sensor readings acquired by the target vehicle and/or the user device may indicate attributes/conditions of a setting within a vehicle cabin of the target vehicle and/or an external environment of the target vehicle. The road attribute data may indicate attributes of one or more road segments defined within the one or more target locations. The POI data may indicate attributes of one or more POIs within the one or more locations and relevance of said POIs with respect to one or more road segments within the one or more locations. The landmark data may indicate attributes of one or more landmarks within the one or more locations and relevance of said landmarks with respect to the one or more road segments within the one or more locations. The vehicle attribute data may indicate specifications of the target vehicle. The driver attribute data may indicate: (1) a pattern of which a driver maneuvers a type of vehicle, where the driver is the target driver or another driver that is estimated to traverse the same location as the target driver; (2) a pattern of which the driver maneuvers the target vehicle; (3) a number of occasions in which the driver violated one or more traffic rules; (4) the severity of the violated traffic rule; (5) a number of vehicle accidents in which the driver was involved; (6) the severity of the vehicle accidents; or (7) a combination thereof. In one embodiment, the sensor data, road attribute data, POI data, landmark data, vehicle attribute data, driver attribute data of the input data may correspond to the sensor data, road attribute data, POI data, landmark data, vehicle attribute data, driver attribute data of the historical data. In one embodiment, the machine learning model may be trained to incorporate transfer learning, thereby enabling the assessment platform 123 to render a prediction of aggressive driver behavior events in locations in which historical data for training the machine learning model is not available (e.g., sensor data, road attribute data, etc.). Transfer learning may be provided as a baseline application for predicting events in which drivers render aggressive behaviors while maneuvering vehicles in said locations until relevant data is collected in such area.

Figure 2:
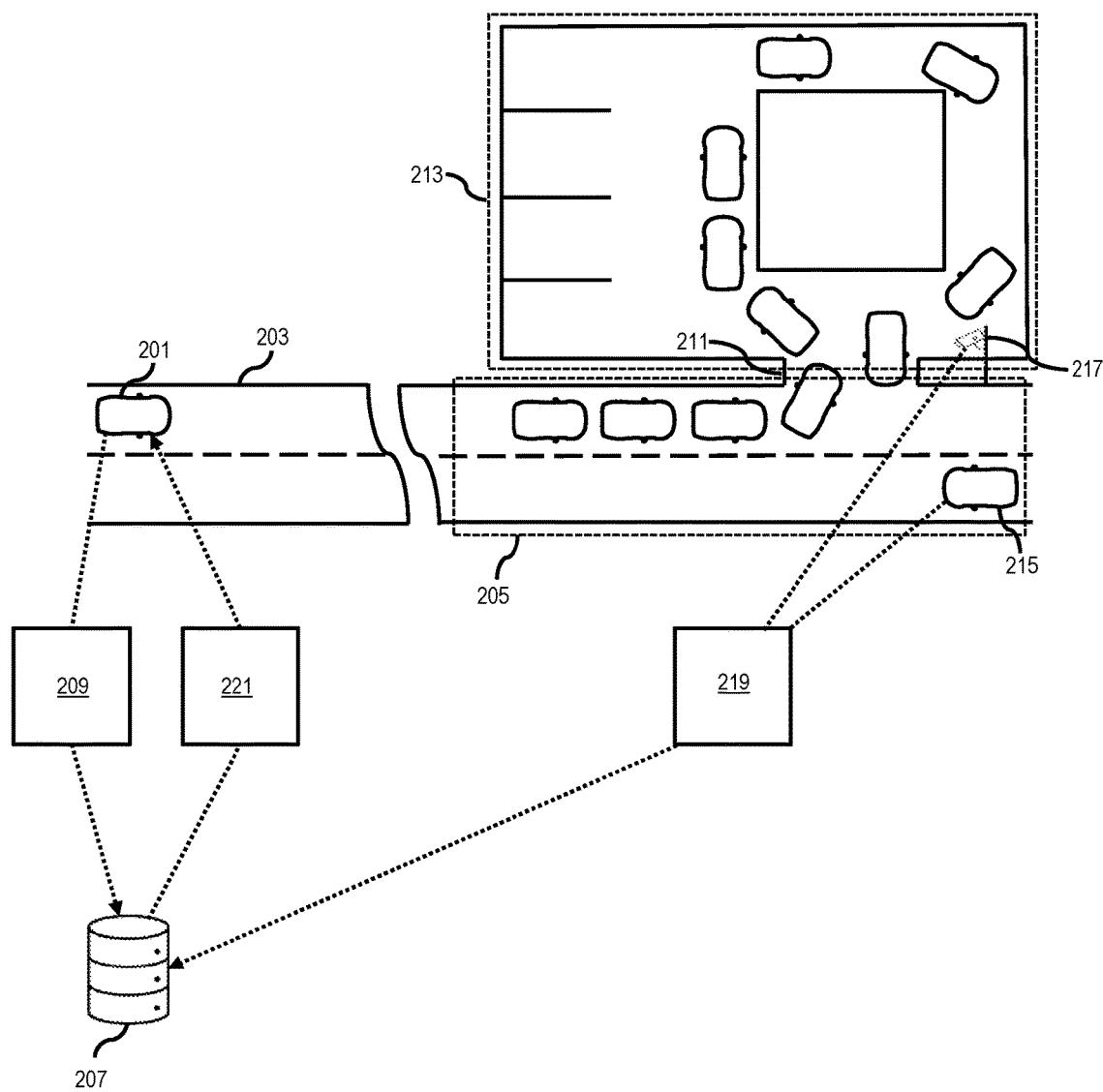
FIG. 2 illustrates an example scenario in which a machine learning model renders a prediction of an aggressive driver behavior event for a target vehicle.

FIG. 2 illustrates an example scenario 200 in which a machine learning model renders a prediction of an aggressive driver behavior event for a target vehicle. In the illustrated example, a target vehicle 201 is traversing a road link 203 and generates a request for predicting an aggressive driver behavior event within a road segment 205 included within the road link 203. Herein, a road link should be construed as a contiguous, non-branching string of one or more road segments terminating in a node at each end. The target vehicle 201 may correspond to the vehicle 105 of FIG. 1. The target vehicle 201 transmits to a server 207 first data packets 209 including the request, sensor data associated with the target vehicle 201, vehicle attribute data associated with the target vehicle 201, and driver attribute data associated with a target driver of the target vehicle 201. The server 207 embodies a machine learning model for rendering a prediction of an aggressive driver behavior event. The server 207 may correspond to the assessment platform 123 of FIG. 1. In the illustrated embodiment, the road segment 205 is connected to an entrance/exit 211 of a POI 213, a vehicle 215 is traversing the road segment 205, and a surveillance post 217 is positioned proximate to the entrance/exit 211. The POI 213 is a drive-through restaurant, and due to the dimensions of the POI 213, the dimensions of the entrance/exit 211, and the traffic density within the POI 213, the traffic density is inevitably increased within the road segment 205. Each of the vehicle 215 and the surveillance post 217 is equipped with an image sensor and observes the state of the road segment 205. The vehicle 215 and the surveillance post 217 may correspond to the detection entity 113 of FIG. 1. The vehicle 215 and the surveillance post 217 are communicatively coupled to the server 207 and transmits second data packets 219 to the server. The second data packets 219 include images of the entrance/exit 211, a portion of the road segment 205, and the traffic density within the road segment 205. In addition to receiving the first and the second data packets 209 and 219, the server 207 may acquire additional data (not illustrated) indicating road attribute data associated with the road segment 205, POI attribute data associated with the POI 213, vehicle attribute data associated with one or more vehicles within the road segment 205, and driver attribute data associated with said vehicles within the road segment 205. It should be appreciated that the server 207 may receive such data from the vehicle 215, the surveillance post 217, other vehicles within the road segment 205, the entrance/exit 211, or the POI 213, other sources (e.g., entities such as database 125, services platform 115, content providers 119, etc.), or a combination thereof. The first data packet 209, the second data packets 217, and the additional data are provided as input data to the machine learning model. In response, the machine learning model generates and transmits to the target vehicle 201 a third data packet 221 including a prediction indicating a likelihood of which an aggressive driver behavior will occur at the road segment 205. In one embodiment, the prediction may indicate a reason for the cause the aggressive drive behavior, a likelihood in which a specific vehicle will render an aggressive driver behavior at a specific time, or a combination thereof.

Returning to FIG. 1, the assessment platform 123 utilizes outputs of the machine learning model to provide various applications. In one embodiment, the assessment platform 123 uses the output of the machine learning model to generate a map layer including one or more locations, where each of the one or more locations indicates a likelihood in which an aggressive driver behavior event is likely to occur at said location. In one embodiment, the assessment platform 123 may generate a route to a destination based on one or more locations in which an aggressive driver behavior event is predicted to occur. For example, the assessment platform 123 may generate a route to a destination that avoids one or more locations having a "high" level of likelihood of an aggressive driver behavior event occurring therein. In one embodiment, the assessment platform 123 may generate a notification that discourages drivers from traversing one or more locations that is predicted to have a "high" level of likelihood of an aggressive driver behavior event occurring therein. In one embodiment, the assessment platform 123 may generate a recommendation for a driver to start traversing a scheduled route at an earlier time point or a later time point such that the driver avoids an aggressive driver event that is predicted to occur at a given location within the route during a given period. In one embodiment, the assessment platform 123 may provide a notification of an aggressive driver behavior event that is predicted occur at a given location during a given period. The notification may include recommendations and tips that the driver can follow to prevent or mitigate increase in the driver's aggression when the driver encounters the aggressive driver behavior event. The notification may also include recommendations indicating which driving maneuvers that the driver should not execute at the location of the aggressive driver behavior event to prevent occurrence of the aggressive driver behavior event.

Figure 3:
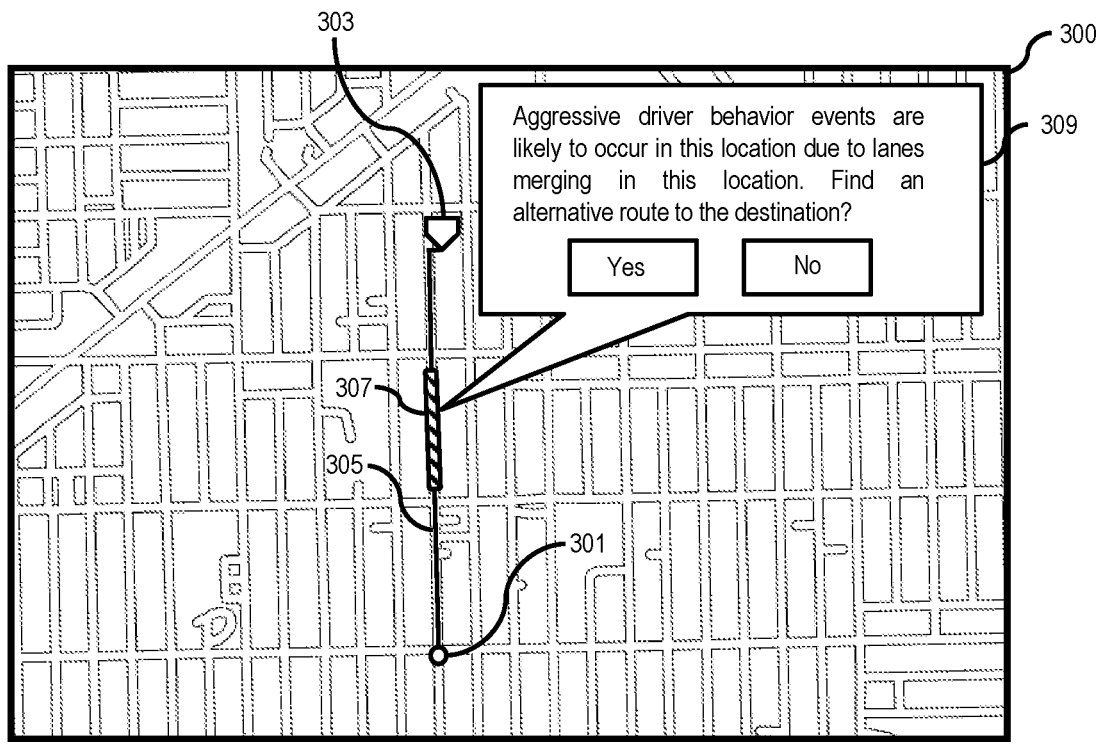
FIG. 3 illustrates an example visual representation indicating a location in which an aggressive driver behavior event is likely to occur.

The assessment platform 123 is capable of generating notifications and/or other types of information based on an output of the machine learning model. The assessment platform 123 may transmit the notifications to the UE 101 and/or a user interface associated with the vehicle 105. The notification may include sound notification, display notification, vibration, or a combination thereof. In one embodiment, the assessment platform 123 may cause the UE 101 and/or the user interface associated with the vehicle 105 to generate a visual representation indicating the output of the machine learning model. For example, FIG. 3 illustrates an example visual representation 300 indicating a location in which an aggressive driver behavior event is likely to occur. In the illustrated example, the visual representation 300 displays a map including an avatar 301 indicating a current location of a vehicle, a destination 303, a route 305 to the destination 303, and a highlighted section 307 of the route 305. The machine learning model has generated output data indicating that an aggressive driver behavior is likely occur at the highlighted section 307 when the vehicle encounters the location of the highlighted section 307 due to the highlighted section 307 having a lane merging point. As such, the visual representation includes a message prompt 309 stating "AGGRESSIVE DRIVER BEHAVIOR EVENTS ARE LIKELY TO OCCUR IN THIS LOCATION DUE TO LANES MERGING IN THIS LOCATION. FIND AN ALTERNATIVE ROUTE TO THE DESTINATION?"

The assessment platform 123 can be implemented in hardware, firmware, software, or a combination thereof. Though depicted as a separate entity in FIG. 1, it is contemplated that the assessment platform 123 may be implemented for direct operation by the UE 101, the vehicle 105, the services platform 115, one or more of the content providers 119, or a combination thereof. As such, the assessment platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in predicting events in which drivers render aggressive behaviors while maneuvering vehicles. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
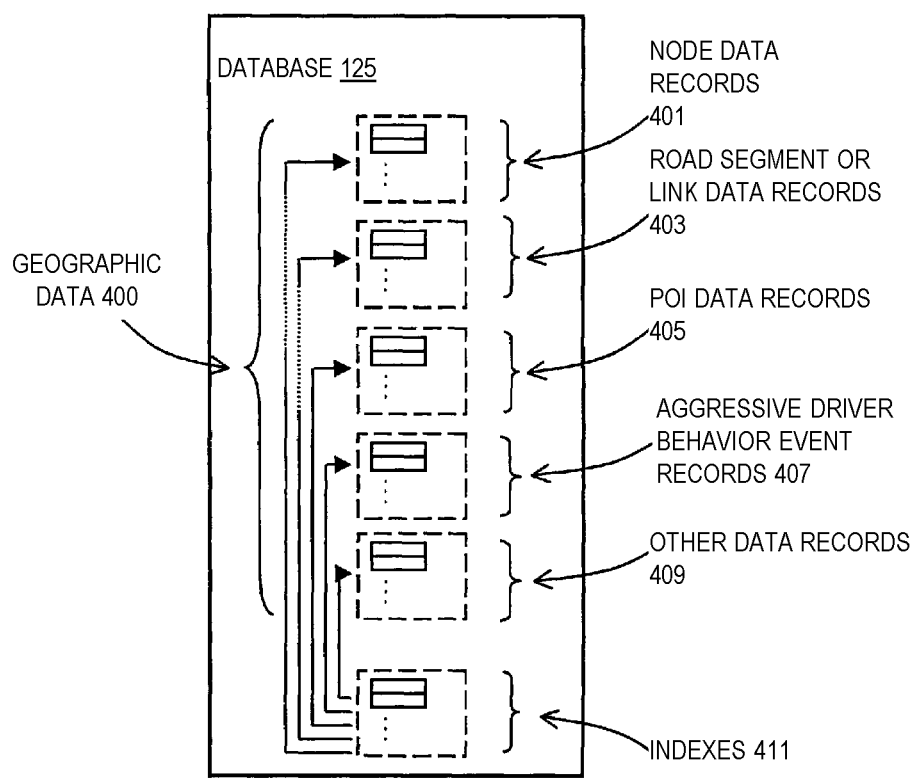
FIG. 4 illustrates a diagram of a database of FIG. 1.

FIG. 4 is a diagram of a database 125 (e.g., a map database), according to one embodiment. In one embodiment, the database 125 includes data 200 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multilevel tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 125 includes node data records 401, road segment or link data records 403, POI data records 405, aggressive driver behavior event records 407, other records 409, and indexes 411, for example. More, fewer or different data records can be provided. In one embodiment, additional data records (not shown) can include cartographic ("carto") data records, routing data, and maneuver data. In one embodiment, the indexes 411 may improve the speed of data retrieval operations in the database 125. In one embodiment, the indexes 411 may be used to quickly locate data without having to search every row in the database 125 every time it is accessed.

In exemplary embodiments, the road segment data records 403 are links or segments representing roads, streets, or paths, as can be used in the calculated route or recorded route information for determination of one or more personalized routes. The node data records 401 are end points (such as intersections) corresponding to the respective links or segments of the road segment data records 403. The road link data records 403 and the node data records 401 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 205. The database 125 can also include data about places, such as cities, towns, or other communities, and other geographic features, such as bodies of water, mountain ranges, etc. Such place or feature data can be part of the POI data records 405 or can be associated with POIs or POI data records 405 (such as a data point used for displaying or representing a position of a city).

The aggressive driver behavior event records 407 include historical data indicating events in which drivers rendered aggressive behaviors. The historical data include sensor data indicating ways of which drivers expressed the aggressive driver behaviors (e.g., facial expressions, verbal expressions, ways of which drivers maneuvered vehicles to express aggression, etc.). The sensor data also indicate other types of sensor data that define the contexts in which the aggressive driver behavior events have occurred. For example, such sensor data may indicate: (1) air temperature levels within the vehicles during the aggressive driver behavior events; (2) noise/sound levels within the vehicles during the aggressive driver behavior events; (3) one or more object of which the drivers were observing during the aggressive driver behavior events (e.g., via eye tracking through driver facing cameras); (4) images of environments in which the vehicles were traversing during the aggressive driver behavior events; (5) weather conditions in which the vehicles were traversing during the aggressive driver behavior events; (6) speed levels at which the vehicles were traversing during the aggressive driver behavior events; (7) a number of vehicles impacted by the vehicles of the aggressive driver behavior events (e.g., a number of vehicles that had to brake, avoid, or deviate from original routes thereof); or (8) a combination thereof. The historical data may further indicate: (1) paths of movements taken by vehicles involved in the aggressive driver behavior events; (2) objects (e.g., POIs, landmarks, road objects, etc.) as defined within map data that are relevant to the aggressive driver behavior events; (3) road attribute data associated with the aggressive driver behavior events; (4) traffic density information associated with the aggressive driver behavior events; (5) pattern of movements for vehicles involved in the aggressive driver behavior events; (6) solar attribute information (e.g., sun angle, sun intensity level, etc.) associated with the aggressive driver behavior events; (7) roadside events that were concurrently occurring at the location of the aggressive driver behavior events; (8) vehicle attribute data associated with vehicles involved in the aggressive driver behavior events; (9) driver attribute data associated with drivers involved in the aggressive driver behavior events; (10) predicted cause of the aggressive driver behavior events; or (11) a combination thereof.

Other records 409 may include information indicating attributes of landmarks within a road network. Such information details a type of landmark, dimensions of landmarks, positions/orientations of the landmarks, etc. The information indicating attributes of landmarks may be used in the context of aggressive driver behavior events to detail reasons as to why the aggressive driver behavior event has occurred at a given location and at a given period.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for predicting events in which drivers render aggressive behaviors while maneuvering vehicles may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 5:
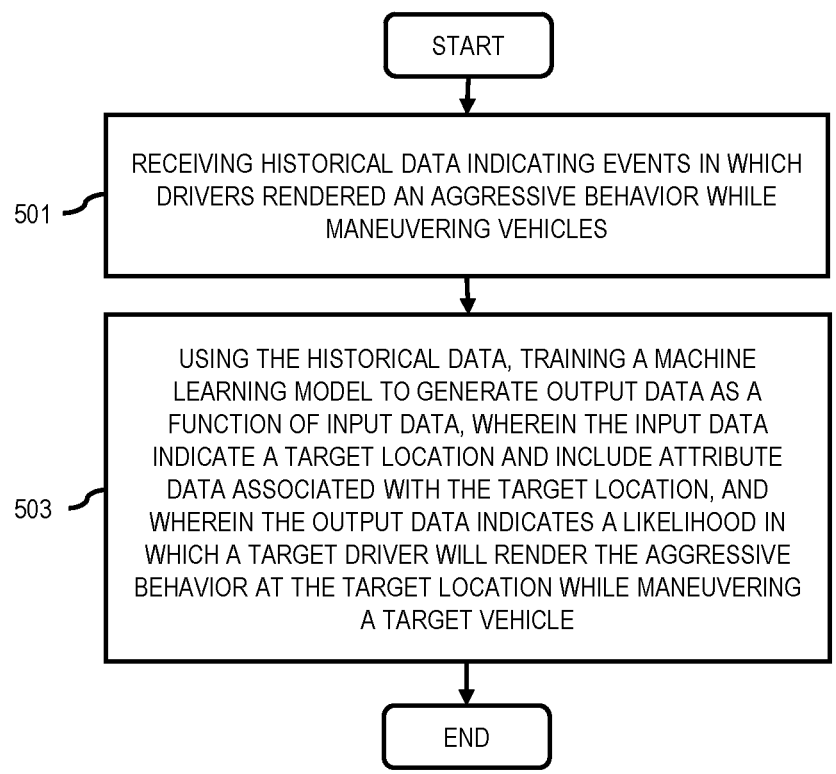
FIG. 5 illustrates a flowchart of a process for training a machine learning model to predict events in which drivers render aggressive behaviors while maneuvering vehicles.
Figure 8:
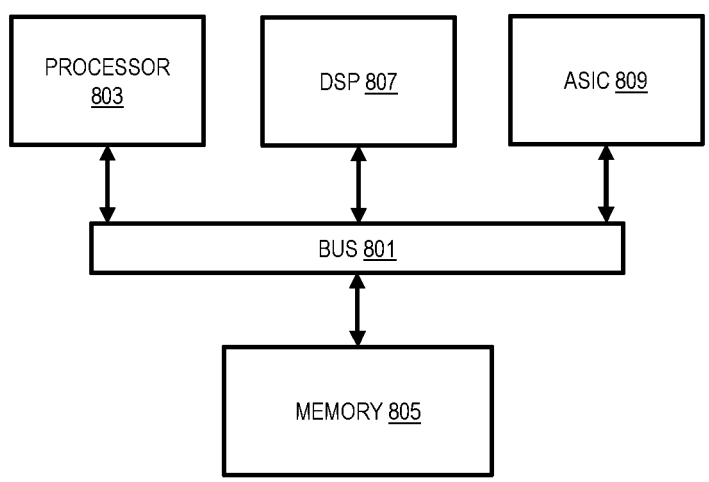
FIG. 8 illustrates a chip set or chip upon which an embodiment may be implemented.

FIG. 5 is a flowchart of a process 500 for training a machine learning model to predict events in which drivers render aggressive behaviors while maneuvering vehicles, according to one embodiment. In one embodiment, the assessment platform 123 performs the process 500 and is implemented in, for instance, a chip set including a processor and a memory as shown in FIG. 8.

In step 501, the assessment platform 123 receives historical data indicating events in which drivers rendered an aggressive behavior while maneuvering vehicles. In one embodiment, the historical data indicate attributes associated with road segments in which the events have occurred, attributes associated with POIs within peripherals of the road segments, attributes associated with landmarks within the peripherals, or a combination thereof. In one embodiment, the historical data include sensor data indicating ways of which drivers expressed the aggressive driver behaviors (e.g., facial expressions, verbal expressions, ways of which drivers maneuvered vehicles to express aggression, etc.). The sensor data also indicate other types of sensor data that define the contexts in which the aggressive driver behavior events have occurred. For example, such sensor data may indicate: (1) air temperature levels within the vehicles during the aggressive driver behavior events; (2) noise/sound levels within the vehicles during the aggressive driver behavior events; (3) one or more object of which the drivers were observing during the aggressive driver behavior events (e.g., via eye tracking through driver facing cameras); (4) images of environments in which the vehicles were traversing during the aggressive driver behavior events; (5) weather conditions in which the vehicles were traversing during the aggressive driver behavior events; (6) speed levels at which the vehicles were traversing during the aggressive driver behavior events; (7) a number of vehicles impacted by the vehicles of the aggressive driver behavior events (e.g., a number of vehicles that had to brake, avoid, or deviate from original routes thereof); or (8) a combination thereof. The historical data indicate: (1) paths of movements taken by vehicles involved in the aggressive driver behavior events; (2) objects (e.g., POIs, landmarks, road objects, etc.) as defined within map data that are relevant to the aggressive driver behavior events; (3) road attribute data associated with the aggressive driver behavior events; (4) traffic density information associated with the aggressive driver behavior events; (5) pattern of movements for vehicles involved in the aggressive driver behavior events; (6) solar attribute information (e.g., sun angle, sun intensity level, etc.) associated with the aggressive driver behavior events; (7) roadside events that were concurrently occurring at the location of the aggressive driver behavior events; (8) vehicle attribute data associated with vehicles involved in the aggressive driver behavior events; (9) driver attribute data associated with drivers involved in the aggressive driver behavior events; (10) predicted cause of the aggressive driver behavior events; or (11) a combination thereof.

In step 503, the assessment platform 123 trains a machine learning model to generate output data as a function of input data by using the historical data. The input data indicate a target location and include attribute data associated with the target location, and the output data indicates a likelihood in which a target driver will render the aggressive behavior at the target location while maneuvering a target vehicle. In one embodiment, the assessment platform 123 transforms the historical data into machine-readable and generalizable vectors. The machine learning model renders context around the historical data such that commonalities can be detected. Once the machine learning model translates the historical data into a vector format suitable to be used as a feature vector for machine learning, the assessment platform 123 trains the machine learning model on resulting pairs (i.e., observations as seen in the historical data and desired output value). In one embodiment, the machine learning model may incorporate a standard regression or classification task.

Figure 6:
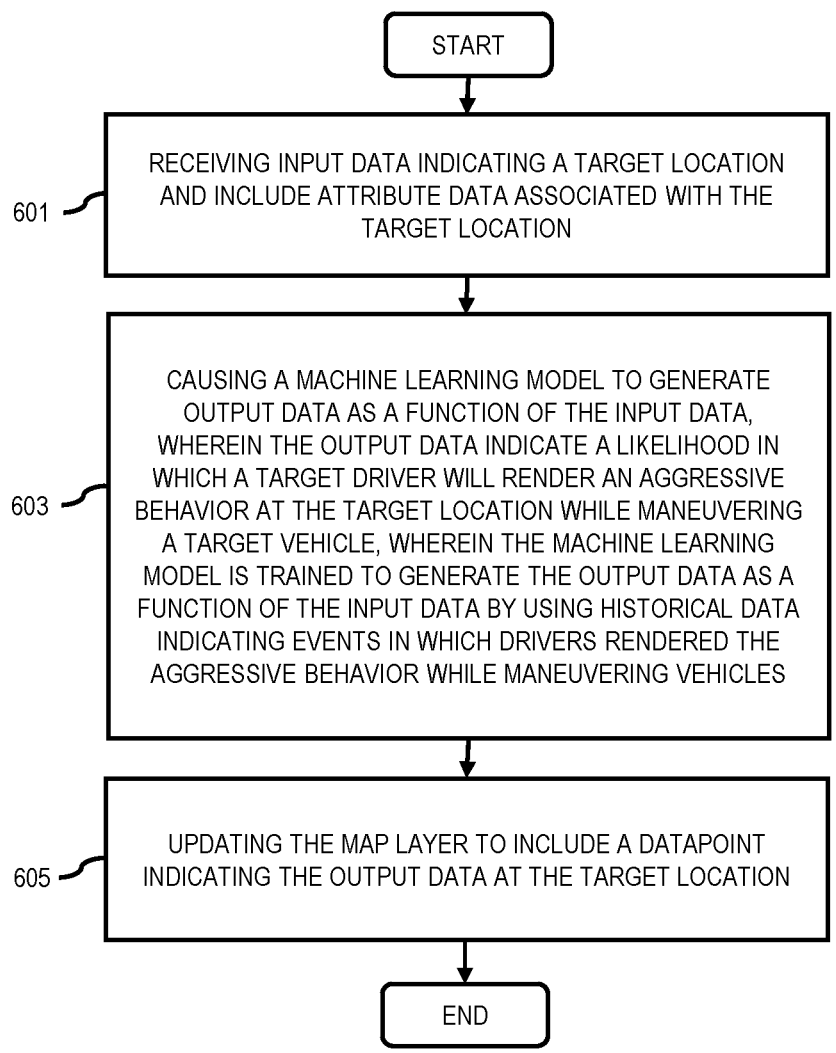
FIG. 6 illustrates a flowchart of a process for providing a map layer of one or more aggressive driver behavior events.

FIG. 6 is a flowchart of a process 600 for providing a map layer of one or more aggressive driver behavior events, according to one embodiment. In one embodiment, the assessment platform 123 performs the process 600 and is implemented in, for instance, a chip set including a processor and a memory as shown in FIG. 8.

In step 601, the assessment platform 123 receives input data indicating a target location and include attribute data associated with the target location. The input data may further indicate sensor data acquired at the target location and contextual data associated with target location. Such data may be acquired by one or more detection entities 113 that are within the target location, the services platform 115, the content providers 119, the database 125, or a combination thereof.

In step 603, the assessment platform 123 causes a machine learning model to generate output data as a function of the input data. The output data indicate a likelihood in which a target driver will render an aggressive behavior at the target location while maneuvering a target vehicle. The machine learning model is trained to generate the output data as a function of the input data by using historical data indicating events in which drivers rendered the aggressive behavior while maneuvering vehicles.

In step 605, the assessment platform 123 updates the map layer to include a datapoint indicating the output data at the target location. In one embodiment, the map layer includes one or more other datapoints indicating one or more other likelihoods in which the target driver will render the aggressive behavior at one or more other target locations while maneuvering the target vehicle.

The system, apparatus, and methods described herein reliably predict locations in which aggressive driver behavior events will occur and inform drivers regarding such prediction, thereby enabling the drivers to avoid such locations and improving user experience for the drivers. Additionally, the system, apparatus, and methods incorporate historical data including road attribute data and POI and landmark attribute data associated with past aggressive driver behavior events to train a machine learning model for predicting an aggressive driver behavior event, thereby improving the accuracy of which the machine learning model yields the prediction.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
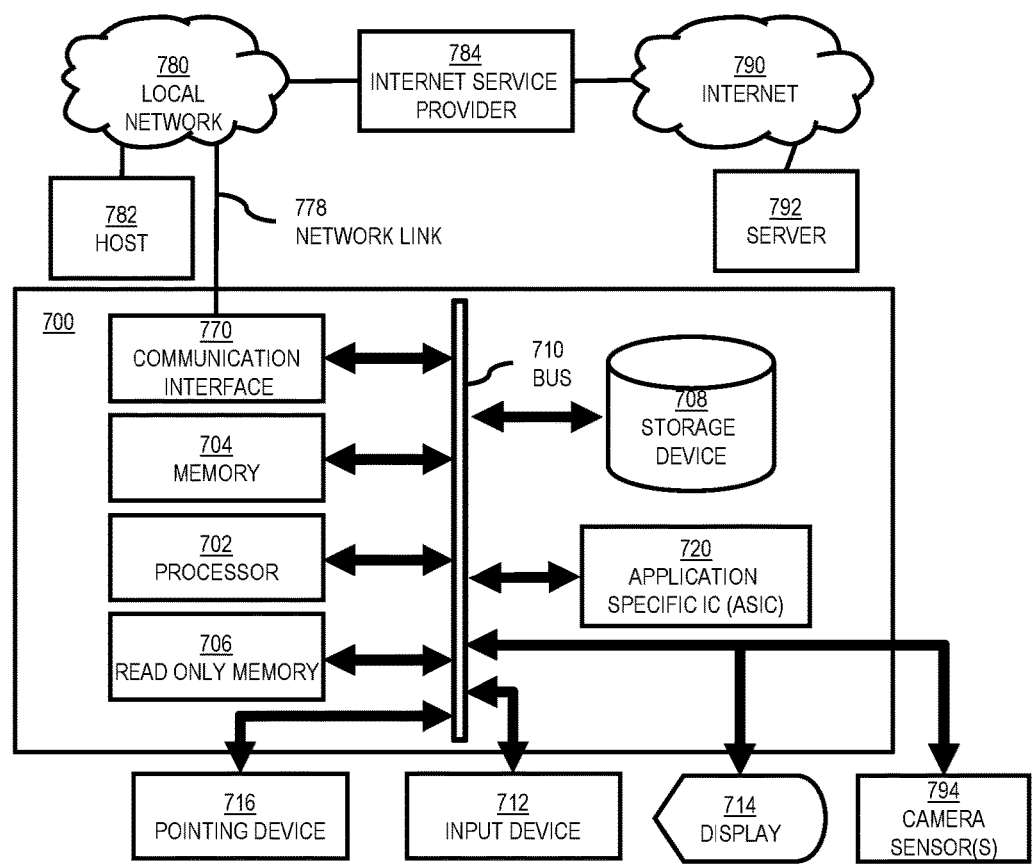
FIG. 7 illustrates a computer system upon which an embodiment may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to predict events in which drivers render aggressive behaviors while maneuvering vehicles as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of predicting events in which drivers render aggressive behaviors while maneuvering vehicles.

A bus 710 includes one or more parallel conductors of information so that information is transferred quickly among devices coupled to the bus 710. One or more processors 702 for processing information is coupled with the bus 710.

A processor (or multiple processors) 702 performs a set of operations on information as specified by computer program code related to predicting events in which drivers render aggressive behaviors while maneuvering vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for predicting events in which drivers render aggressive behaviors while maneuvering vehicles. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 77 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for predicting events in which drivers render aggressive behaviors while maneuvering vehicles, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 121 for predicting events in which drivers render aggressive behaviors while maneuvering vehicles to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 782 connected to the Internet hosts a process that provides a service in response to information received over the Internet. For example, server host 782 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 782 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to predict events in which drivers render aggressive behaviors while maneuvering vehicles as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of predicting events in which drivers render aggressive behaviors while maneuvering vehicles.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real-time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors. The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to predict events in which drivers render aggressive behaviors while maneuvering vehicles. The memory 805 also stores the data associated with or generated by the execution of the inventive steps.

Figure 9:
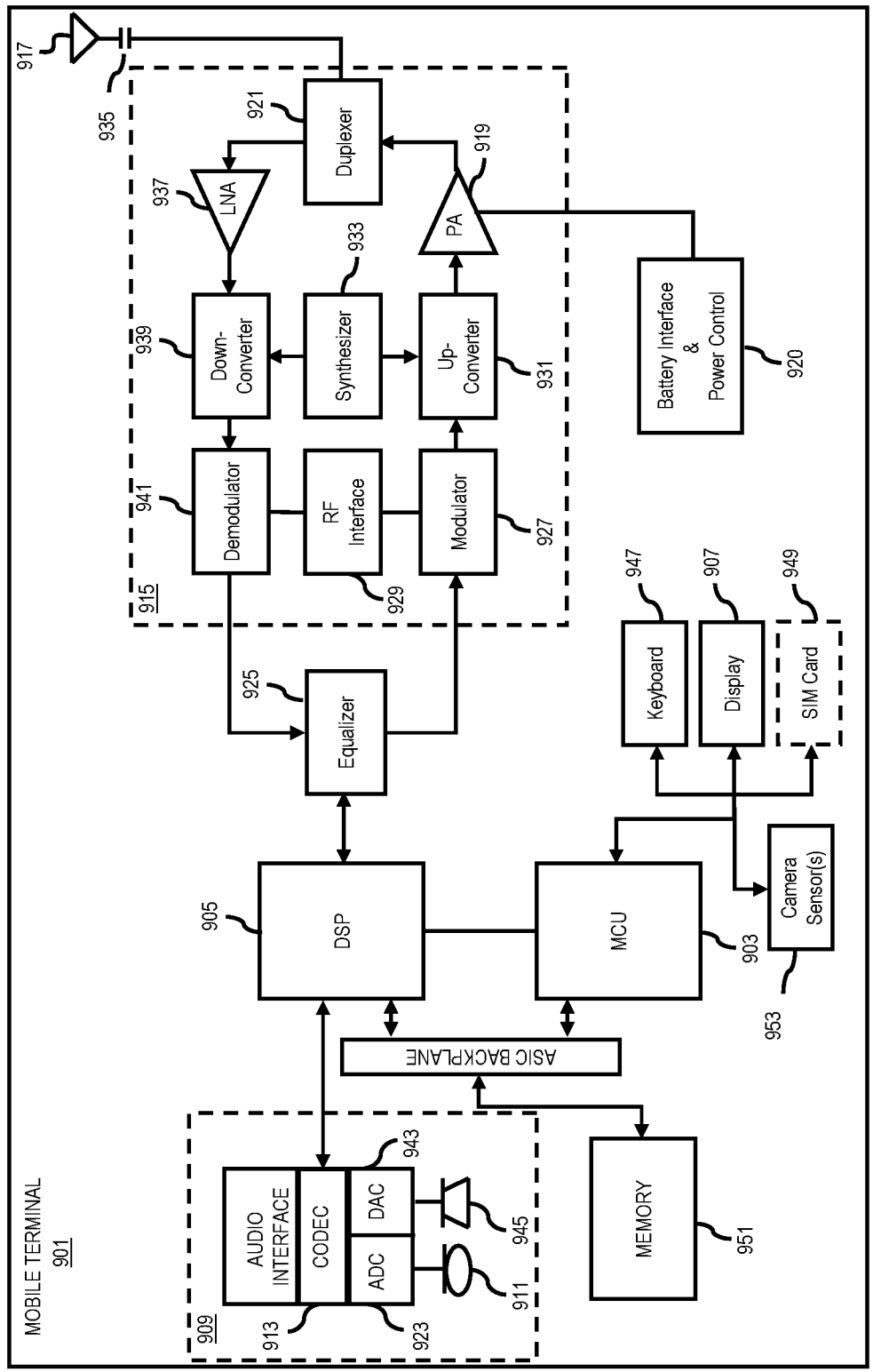
FIG. 9 illustrates a diagram of exemplary components of a mobile terminal for communications, which is capable of operating in the system of FIG. 1.

FIG. 9 is a diagram of exemplary components of a mobile terminal 901 (e.g., a mobile device or vehicle or part thereof) for communications, which is capable of operating in the system of FIG. 1, according to one embodiment. In some embodiments, mobile terminal 901, or a portion thereof, constitutes a means for performing one or more steps of predicting events in which drivers render aggressive behaviors while maneuvering vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of predicting events in which drivers render aggressive behaviors while maneuvering vehicles. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to predict events in which drivers render aggressive behaviors while maneuvering vehicles. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
receive historical data indicating events in which drivers rendered an aggressive behavior while maneuvering vehicles, the historical data indicating attributes associated with road segments in which the events have occurred;
using the historical data, train a machine learning model to generate output data as a function of input data, wherein the input data indicate starting location of a target vehicle, a destination location of the target vehicle, a target location of a portion of a route starting from the starting location and terminating at the destination location, and attributes associated with the target location, and wherein the output data indicates a likelihood in which an aggressive driver behavior event will occur at the target location when the target vehicle reaches the target location;
receive the input data;
cause the trained machine learning model to generate the output data as the function of the input data;
output, on a user interface of a user equipment, navigation information associated with the route, and information pertaining to the portion of the route and the output data; and
responsive to the output data indicating that the aggressive driver behavior event will occur at the target location when the target vehicle reaches the target location, output a prompt including a recommendation of an alternative route on the user interface.

2. The apparatus of claim 1, wherein the attributes associated with the road segments indicate, for each of the road segments: (i) a road segment type; (ii) a dimension; (iii) a number of lanes; (iv) a number of traffic directions supported by said road segment; (v) a width of each lane; (vi) a number of shoulders; (vii) a width of each shoulder; (viii) a road surface condition; (ix) a number of traffic signs; (x) a type of traffic sign; (xi) a number of traffic cameras; (xii) a type of traffic camera; (xiii) a number of traffic lights; (xiv) a number of crosswalks; (xv) a number of bike lanes; (xvi) a width of each bike lane; (xvii) a curvature; or (xviii) a combination thereof.

3. The apparatus of claim 1, wherein the historical data further indicates attribute associated with points-of-interest (POIs) within peripherals of the road segments, and wherein the attributes associated with the POIs indicate, for each of the POIs: (i) a type of POI; (ii) a dimension; (iii) whether a roadway belonging to said POI is directly connected to one of the road segments; (iv) a position of said POI relative to one of the road segments; (v) one or more types of vehicle entering or exiting said POI; or (vi) a combination thereof.

4. The apparatus of claim 3, wherein the historical data further indicates attributes associated with landmarks within the peripherals, and wherein the attributes associated with the landmarks indicate, for each of the landmarks: (i) a type of landmark; (ii) a dimension; (iii) a position of said landmark relative to one of the road segments; or (iv) a combination thereof.

5. The apparatus of claim 1, wherein the historical data further indicate gesture information associated with the drivers, and wherein the gesture information is acquired from periods defined by points of time in which the drivers entered the vehicles up to subsequent points of time in which the drivers rendered the aggressive behavior.

6. The apparatus of claim 1, wherein the historical data further indicate a first degree of vehicle traffic within locations of the events, a second degree of micromobility vehicle traffic within the locations, and a third degree of pedestrian traffic within the locations, or a combination thereof.

7. The apparatus of claim 6, wherein the historical data further indicate a first pattern of movement for the vehicle traffic within the locations, a second pattern of movement for the micromobility vehicle traffic within the locations, a third pattern of movement for the pedestrian traffic within the locations, or a combination thereof.

8. The apparatus of claim 1, wherein the historical data further indicate directions of the vehicles during the events, sun angles with respect to locations of the events, and sun intensity levels during the events.

9. A non-transitory computer-readable storage medium having computer program code instructions stored therein, the computer program code instructions, when executed by at least one processor, cause the at least one processor to:
receive input data indicating a starting location of a target vehicle, a destination location of a target vehicle, a target location of a portion of a route starting from the starting location and terminating at the destination location, and attributes associated with the target location;
cause a machine learning model to generate output data as a function of the input data, wherein the output data indicate a likelihood in which an aggressive driver behavior event will occur at the target location when the target vehicle reaches the target location, wherein the machine learning model is trained to generate the output data as a function of the input data by using historical data indicating events in which drivers rendered the aggressive behavior while maneuvering vehicles, and wherein the historical data indicate attributes associated with road segments in which the events have occurred;
output, on a user interface of a user equipment, navigation information associated with the route, and information pertaining to the portion of the route and the output data; and
responsive to the output data indicating that the aggressive driver behavior event will occur at the target location when the target vehicle reaches the target location, output a prompt including a recommendation of an alternative route on the user interface.

10. The non-transitory computer-readable storage medium of claim 9, wherein the attributes associated with the road segments indicate, for each of the road segments: (i) a road segment type; (ii) a dimension; (iii) a number of lanes; (iv) a number of traffic directions supported by said road segment; (v) a width of each lane; (vi) a number of shoulders; (vii) a width of each shoulder; (viii) a road surface condition; (ix) a number of traffic signs; (x) a type of traffic sign; (xi) a number of traffic cameras; (xii) a type of traffic camera; (xiii) a number of traffic lights; (xiv) a number of crosswalks; (xv) a number of bike lanes; (xvi) a width of each bike lane; (xvii) a curvature; or (xviii) a combination thereof, and wherein the attribute data include types of information corresponding to the first attributes.

11. The non-transitory computer-readable storage medium of claim 9, wherein the historical data further indicates attributes associated with points-of-interest (POIs) within peripherals of the road segments, and wherein the attributes associated with the POIs indicate, for each of the POIs: (i) a type of POI; (ii) a dimension; (iii) whether a roadway belonging to said POI is directly connected to one of the road segments; (iv) a position of said POI relative to one of the road segments; (v) one or more types of vehicle entering or exiting said POI; or (vi) a combination thereof, and wherein the attribute data include types of information corresponding to the second attributes.

12. The non-transitory computer-readable storage medium of claim 11, wherein the historical data further indicates attributes associated with landmarks within the peripherals, and wherein the attributes associated with the landmarks indicate, for each of the landmarks: (i) a type of landmark; (ii) a dimension; (iii) a position of said landmark relative to one of the road segments; or (iv) a combination thereof, and wherein the attribute data include types of information corresponding to the third attributes.

13. The non-transitory computer-readable storage medium of claim 9, wherein the historical data further indicate gesture information associated with the drivers, wherein the gesture information is acquired from periods defined by points of time in which the drivers entered the vehicles up to subsequent points of time in which the drivers rendered the aggressive behavior, wherein the input data include target gesture information associated with the target driver.

14. The non-transitory computer-readable storage medium of claim 9, wherein the historical data further indicate a first degree of vehicle traffic within locations of the events, a second degree of micromobility vehicle traffic within the locations, and a third degree of pedestrian traffic within the locations, or a combination thereof, wherein the attribute data include first types of information corresponding to the first degree of vehicle traffic, the second degree of micromobility vehicle traffic, and the third degree of pedestrian traffic.

15. The non-transitory computer-readable storage medium of claim 14, wherein the historical data further indicate a first pattern of movement for the vehicle traffic within the locations, a second pattern of movement for the micromobility vehicle traffic within the locations, a third pattern of movement for the pedestrian traffic within the locations, or a combination thereof, and wherein the attribute data include second types of information corresponding to the first pattern of movement, the second pattern of movement, and the third pattern of movement.

16. A method of providing a map layer of one or more aggressive driver behavior events, the method comprising:
receiving input data indicating a starting location of a target vehicle, a destination location of a target vehicle, a target location of a portion of a route starting from the starting location and terminating at the destination location, and attributes associated with the target location;
causing a machine learning model to generate output data as a function of the input data, wherein the output data indicate a likelihood in which an aggressive driver behavior event will occur at the target location when the target vehicle reaches the target location, wherein the machine learning model is trained to generate the output data as a function of the input data by using historical data indicating events in which drivers rendered the aggressive behavior while maneuvering vehicles, and wherein the historical data indicate first-attributes associated with road segments in which the events have occurred;
output, on a user interface of a user equipment, navigation information associated with the route, and information pertaining to the portion of the route and the output data; and
responsive to the output data indicating that the aggressive driver behavior event will occur at the target location when the target vehicle reaches the target location, output a prompt including a recommendation of an alternative route on the user interface.

17. The apparatus of claim 1, wherein the historical data include sensor data capturing: (i) one or more facial expressions indicating the aggressive behavior; (ii) one or more vocal expressions indicating the aggressive behavior; or (iii) a combination thereof.

18. The apparatus of claim 1, wherein the historical data further indicates attributes associated with points-of-interest (POIs) within peripherals of the road segments, wherein the POIs are buildings, and wherein the historical data indicates whether one or more of the POIs impact visibility of the one or more of the road segments.

19. The apparatus of claim 1, wherein the output data further indicates a cause of the aggressive driver behavior event.

20. The apparatus of claim 1, wherein the navigation information and the information pertaining to the portion of the route are presented as visual representations on the user interface, wherein the visual representations include an avatar representing the starting location as a current location of the target vehicle, the destination location, the route, and a visual marker marking the portion of the route.

* * * * *